Figure 1:
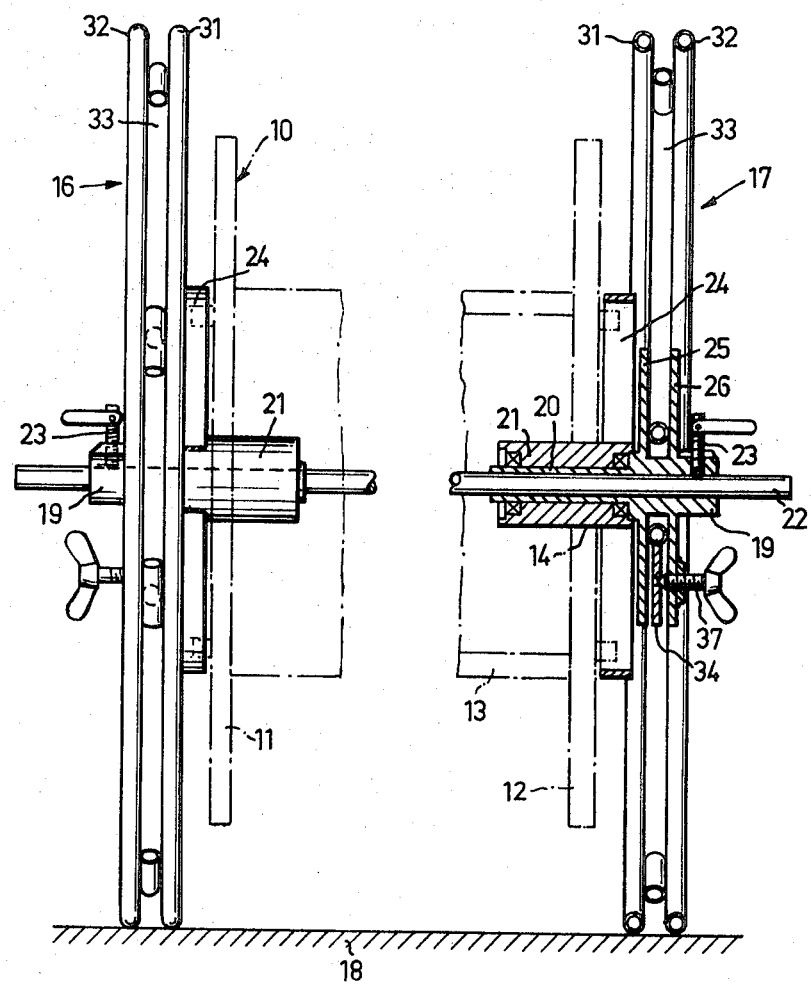

# United States Patent
Awebro

[15] 3,652,026
[45] Mar. 28, 1972

[54] DEVICE FOR SUPPORTING AND TRANSPORTING A CABLE DRUM

[72] Inventor: Folke Hildemar Awebro, V:a Malmgatan 9, 95 100 Lulea, Sweden

[22] Filed: Nov. 4, 1969

[21] Appl. No.: 874,006

[52] U.S. Cl. ......................................... 242/86.5 R, 301/39
[51] Int. Cl. ........................................................ B65h 75/40
[58] Field of Search ..................... 242/86.2, 86.3, 86.4, 86.5, 242/86.51, 86.52, 86.6, 94, 95, 77, 72.2, 85; 301/39, 38

[56] References Cited

UNITED STATES PATENTS

| 970,884 | 9/1910 | Carter | 242/85 UX |
| 1,673,816 | 6/1928 | Emerson et al. | 301/39 |
| 2,257,543 | 9/1941 | Toby | 301/39 |
| 3,152,772 | 10/1964 | Schjerven | 242/94 |

Primary Examiner—Stanley N. Gilreath
Assistant Examiner—Milton Gerstein
Attorney—Cushman, Darby & Cushman

[57] ABSTRACT

A cable drum is supported by bearing sleeves rotatably mounted on the hubs of two support wheels located at the ends of the drum and connected by a shaft. The drum is freely rotatable relative the ground and the support wheels. Each support wheel is composed of a first and a second substantially sector shaped section detachably secured to each other. When mounting the drum on the wheels, the two first sections are first mounted on the shaft through the drum when resting on the ground, whereafter the first sections are tilted together with the drum to a rolling position where the second sections may be mounted on the first sections.

8 Claims, 7 Drawing Figures

INVENTOR.
FOLKE HILDEMAR AWEBRO

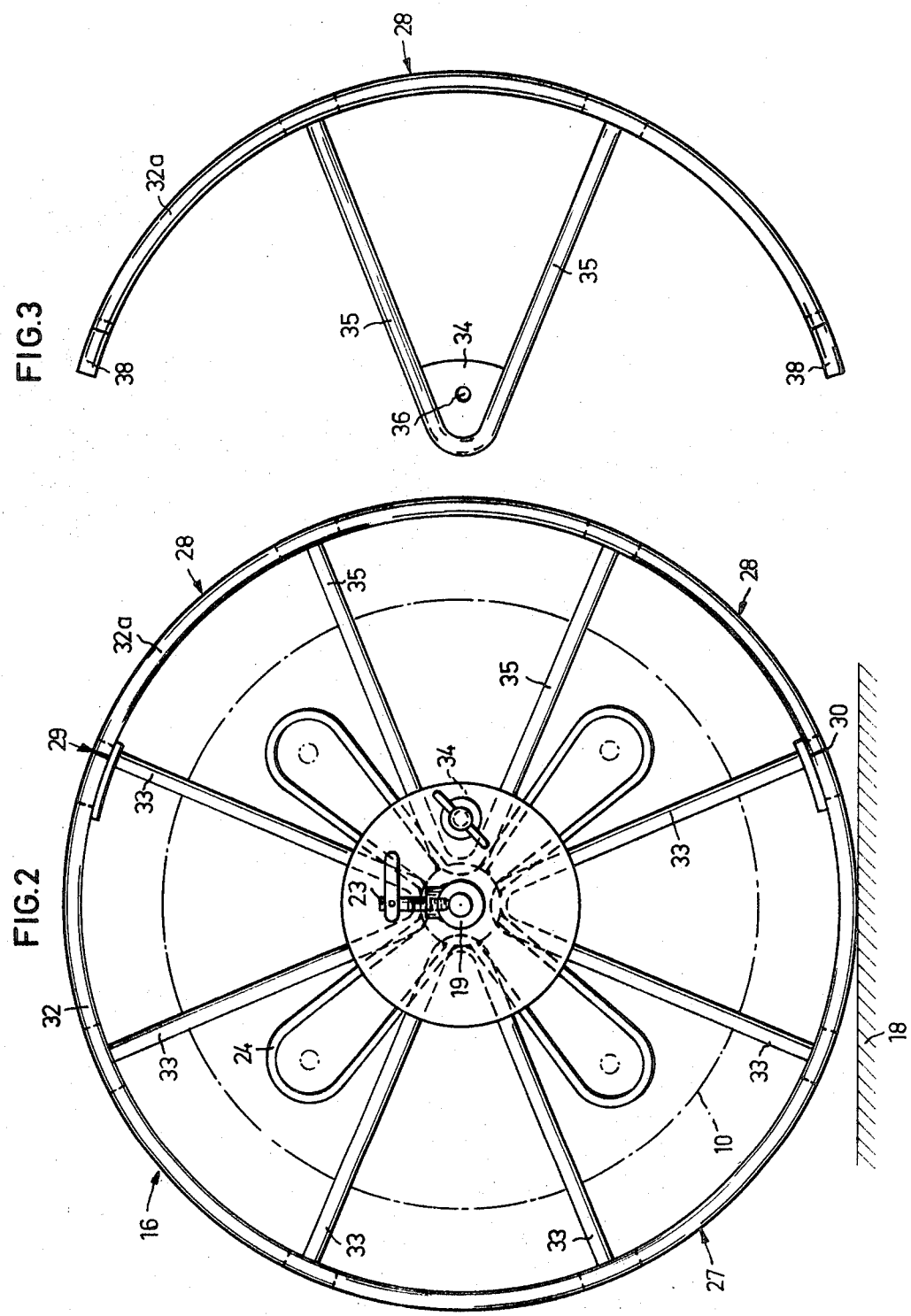

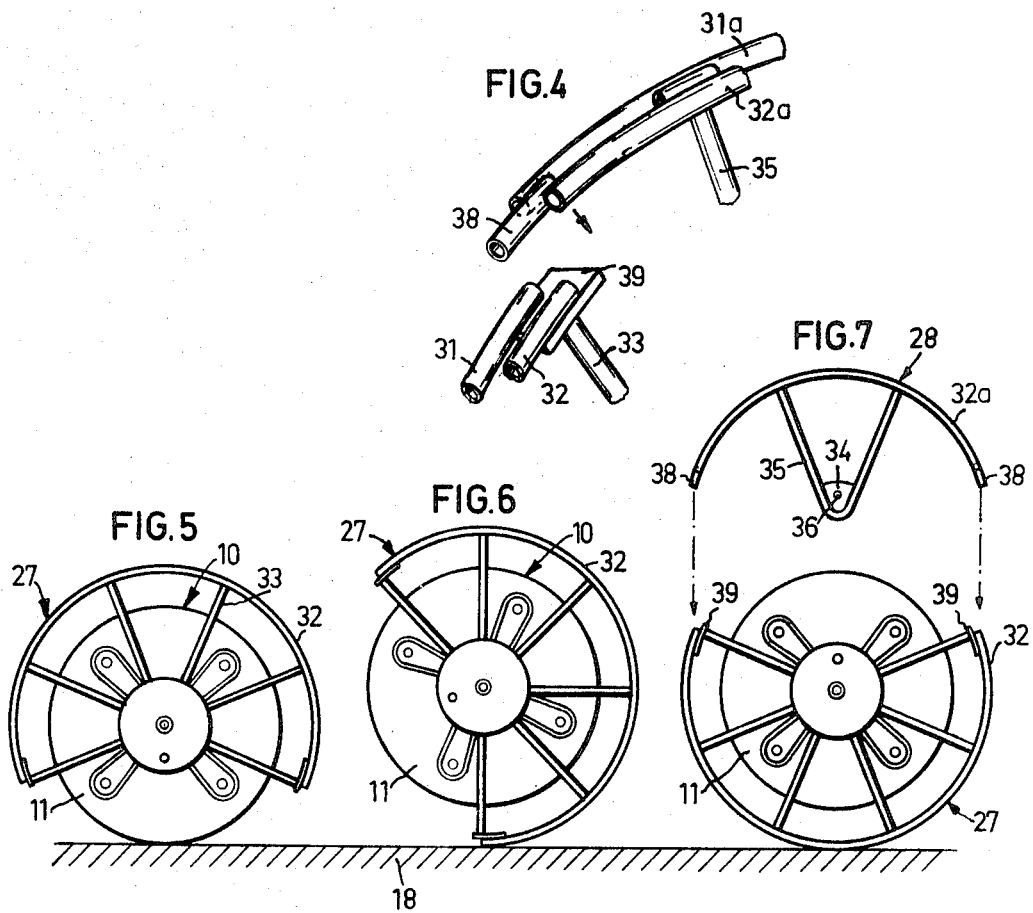

DEVICE FOR SUPPORTING AND TRANSPORTING A CABLE DRUM

The present invention relates to a device for supporting and transporting a cable drum, primarily in cable laying operations.

The device according to the invention is characterized by two support wheels to be located at the ends of the drum and detachably interconnected by a shaft extending centrally through the drum to support the drum freely above the ground, each support wheel having a hub extended to form an axially projecting pivot member supporting a rotatably mounted bearing sleeve which fits into the adjacent center hole of the drum so that the drum is rotatably supported by the two bearing sleeves, each of the support wheels being composed of a first and a second section detachably interconnected and dividing the circumference of the support wheel into two separable portions, said first section supporting the hub of the support wheel and leaving such a free space between its circumferential ends that, when mounting the first and second sections on the drum, the first sections may freely from the ground be inserted onto the ends of the shaft when the drum is resting on the ground and the shaft has been inserted through the drum to receive the bearing sleeves on the hubs of the first sections, whereupon the first sections together with the drum may be tilted to lift the drum from the ground and rolled on their peripheral paths to a position where the two second sections may be mounted and secured on the first sections to form the support wheels. It is thus understood that the device according to the invention will facilitate the handling of a drum in such a manner that a single person may lift the drum from the ground by means of the two first wheel sections and thereafter readily mount the two second wheel sections to form the support wheels so that the device may be rolled to any desired place, where uncoiling the cable from the drum is easily effected upon rotation of the drum on the rotatably mounted bearing sleeves on the hubs of the support wheels.

A preferred embodiment of the device is described in the one by way of example, with reference to the accompanying drawing.

FIG. 1 shows two support wheels carrying a cable drum, one wheel being shown in section, FIG. 2 is an end view of the device in FIG. 1, FIG. 3 is a detail view of the smaller or second section of the two sections forming a support wheel, FIG. 4 is a diagrammatic perspective view of the adjacent peripheral ends of the first and second sections of the support wheels in FIG. 2 in a position just before the second section is mounted on the first section, FIGS. 5-7 are diagrammatic views illustrating the successive operations for mounting the first sections on the shaft through the drum, lifting the drum, and mounting the second sections.

The cable drum 10 is shown in dotted lines in 11, 1 and 2 and diagrammatic in solid lines in FIGS. 5-7. It comprises two circular end walls 12, 12 and a central member 13 therebetween. The end walls have each a central hole 14. The cable to be uncoiled from the drum is omitted in the drawings.

In FIGS. 1, 2 and 7 the drum 10 is supported by two support wheels 16, 17 at a free height above the ground 18.

The support wheels 16, 17 are identical and therefore their details are denoted by same reference numerals.

Each support wheel has a hub 19 which is extended to form an axially projecting pivot member 20 which by means of ball or roller bearings rotatably supports a bearing sleeve 21.

The bearing sleeves 21 are inserted into the central holes 14 of the drum so as to rotatably support the drum. Thus, when the support wheels are standing still, the drum will be free to rotate upon uncoiling the cable. Further, if the support wheels are rolled in the direction to lay the cable, the drum may rotate at the proper speed independent of the support wheels.

The support wheels are held in position by means of a shaft 22 extending through the drum and the hubs 19 and being locked to the hubs by means of screws 23.

Each bearing sleeve 21 is provided with a number of radial arms 24 which are spaced from two radial flanges 25, 26 secured to the hub 19. The arms 24 form distance members between the circular end walls 11, 12 of the drum and the discs 25 so that the drum is accurately located on the rotatable bearing sleeves 21 by abutting against the arms 24.

In order to enable a single person to lift the drum from the ground to its operating position on the bearing sleeves 21 of the support wheels, each support wheel is separable into a first and a second section 27 and 28 respectively as will be seen from FIGS. 5-7.

When the two sections are detachably secured together, as shown in FIG. 2, the two sections interengage each other at two points 29 and 30 along the circumference.

The first and second sections have a circumference formed by two parallel spaced tubes 31, 32 and 31a, 32a respectively. The tubes 31 and 32 of the first section 27 are connected with the flanges 25, 26 of the hub 19 by means of spokes 33, whereas the peripheral tubes 31a, 32a of the second section are connected with a plate 34 by means of two spokes 35. The plate 34 has a hole 36 for receiving the tapering end of a locking screw 37 which is mounted in a threaded hole in the flange 26. As shown in FIG. 1 the locking screw 37 secures the plate 34 in position and thereby the second section 28.

Between the ends of the tubes 31a, 32a is secured a projecting tube piece 38, as shown in FIG. 4, and this tube piece will be located between the ends of the tubes 31, 32 and rest together with the ends of the tubes 31a, 32a on a supporting plate 39 welded to the tubes 31, 32 and the adjacent spoke 33. Thus, the tubes 31, 32 and 31a, 32a will be locked in aligned position.

When the drum 10 is resting on the ground, as shown in FIG. 5, the two first sections 27 are mounted with their bearing sleeves 21 in the central holes of the drum and the shaft 22 is locked in the position shown in FIG. 1. As will be understood from FIG. 5 this mounting is made possible since there is such a free space or gap between the circumferential ends of the first section that in the position shown in FIG. 5 the first sections are free from the ground.

By rotating the two first sections so that they engage the ground, as indicated by dotted lines in FIG. 5, at one of their peripheral ends, the two first sections will form levers to lift the drum to the position shown in FIG. 6. Upon further rolling, the first sections will take the position shown in FIG. 7, where the second sections 28 may be easily mounted and locked on the first sections.

What I claim is:

1. A device for supporting and transporting a cable drum having a hollow core and opposed circular end flanges on said core, the device comprising, in combination, two support wheels located at the ends of the drum and detachably interconnected by a shaft extending through the drum core to support the drum above the ground, each support wheel having a hub to which the shaft is secured, an axially projecting pivot member included in said hub, a bearing sleeve rotatably supported on said pivot member, each bearing sleeve and pivot member being inserted into the adjacent center hole of the drum to support the drum rotatably on the hubs through the two bearing sleeves and pivot members, each of the support wheels being composed of a first section carrying said hub and a second section detachably connected to the first section, said two sections providing complementary parts of the circumference of the support wheel such that the first section has a reduced radial extent in the region of the second section and whereby, with the drum resting on its end flanges, the first sections of the two support wheels can be mounted on opposite ends of the drum by insertion of said bearing sleeves into the hollow core and said first sections can be interconnected by said shaft, whereupon the first sections can be rotated about the shaft axis to lift and support the drum on their aforementioned circumferential parts and said second sections can be secured to the first sections to complete the formation of the support wheels with the drum supported thereon.

2. A device as defined in claim 1, characterized in that the first section of each support wheel has a longer circumferential roller path than the second section.

3. A device as defined in claim 2, characterized in that the peripheral ends of the first and second sections have interengaging locking members provided to maintain the roller paths in position to form a circular roller path.

4. A device as defined in claim 1, characterized in that part of the bearing sleeves are located outside the drum and provided with distance members forming abutments for the ends of the drum.

5. Apparatus for supporting and transporting a cable drum having a hollow core and opposite end flanges secured to said core, the apparatus comprising, in combination, two support wheels at opposite ends of the drum and a shaft joining said wheels, and passing through the hollow core of the drum, each support wheel having a central hub forming a pivot member, a bearing member rotatably mounted on each hub engaging the drum whereby the drum is supported on said wheels through said bearing members, each support wheel comprising a first section carrying said hub and a second section detachably connected to the first section, said two sections providing complementary parts of the circumference of the support wheel and detachable engagement elements on said circumferential parts of the two sections in the region of the junctions of the two sections interconnecting the two sections, said complementary parts being so arranged that the first section and hub has a reduced radial extent in the region of the second section and whereby, with the drum resting on its end flanges, the first sections of the two support wheels can be located on opposite sides of the drum and interconnected by said shaft to engage the bearing members with the drum, whereupon the first sections can be rotated about the shaft axis to lift and support the drum on their peripheral parts and the two second sections be secured to the first sections with the connection of said engagement elements on the circumferential parts of the sections to complete the formation of the support wheels with the drum mounted thereon.

6. A device according to claim 5 wherein said circumferential part of the first section subtends an angle greater than 180°.

7. A device according to claim 5 wherein engagement means for the interconnection of said first and second sections are provided also adjacent each hub.

8. A device according to claim 5 wherein each bearing member has a radially extending portion engageable with an outer face of a drum end flange and an axially extending sleeve projecting into the hollow core and journaled onto said shaft.

* * * * *